US008834589B2

(12) United States Patent
Oshima et al.

(10) Patent No.: US 8,834,589 B2
(45) Date of Patent: Sep. 16, 2014

(54) POLISHING COMPOSITION FOR MAGNETIC DISK SUBSTRATE (75) Inventors: Yoshiaki Oshima, Wakayama (JP);
Norihito Yamaguchi, Wakayama (JP);
Haruhiko Doi, Wakayama (JP)

(73) Assignee: Kao Corporation, Tokyo (JP)

( * ) Notice: Subject to any disclaimer, the term of this patent is extended or adjusted under 35 U.S.C. 154(b) by 542 days.

(21) Appl. No.: 11/790,615

(22) Filed: Apr. 26, 2007

(65) Prior Publication Data
US 2007/0254563 A1  Nov. 1, 2007

(30) Foreign Application Priority Data

Apr. 28, 2006 (JP) ................................. 2006-126276
Sep. 11, 2006 (JP) ................................. 2006-245724

(51) Int. Cl.
*B24D 11/00* (2006.01)
*C09C 1/68* (2006.01)
*C09K 3/14* (2006.01)
*C09G 1/02* (2006.01)

(52) U.S. Cl.
CPC ................ *C09G 1/02* (2013.01); *C09K 3/1409* (2013.01); *C09K 3/1463* (2013.01)
USPC ...................... 51/308; 51/307; 51/309; 106/3

(58) Field of Classification Search
CPC .. C09K 3/1409; C09K 3/1463; B24B 37/044; B24B 37/048; C09G 1/02; H01L 21/3212; H01L 21/7684
USPC ........................................ 51/306–309; 106/3
See application file for complete search history.

(56) References Cited

U.S. PATENT DOCUMENTS

| 6,692,546 | B2 * | 2/2004 | Ma et al. .......................... 51/298 |
| 2002/0028632 | A1 | 3/2002 | Shimamoto et al. |
| 2004/0010979 | A1 | 1/2004 | Oshima et al. |
| 2004/0127147 | A1 * | 7/2004 | Suenaga et al. ................. 451/36 |
| 2005/0208883 | A1 | 9/2005 | Yoshida et al. |
| 2006/0030243 | A1 | 2/2006 | Nishimoto et al. |
| 2007/0167116 | A1 | 7/2007 | Yoshida et al. |

FOREIGN PATENT DOCUMENTS

| CN | 1572858 A | 2/2005 |
| GB | 2375116 A | 11/2002 |
| GB | 2397068 A | 7/2004 |

(Continued)

OTHER PUBLICATIONS

Chinese Office Action dated Jul. 20, 2011, for Application No. 200710101113.0 and English translation thereof.

(Continued)

*Primary Examiner* — Shuangyi Abu Ali
(74) *Attorney, Agent, or Firm* — Birch, Stewart, Kolasch & Birch, LLP (57) ABSTRACT

A polishing composition for a magnetic disk substrate of the present invention includes water, silica particles, and at least one or more selected from an acid, a salt of the acid, and an oxidizing agent. The silica particles are observed with a transmission electron microscope to measure a maximum diameter and a projected area of each particle, and a value obtained by dividing the area of a circle whose diameter is the maximum diameter of a silica particle by the projected area of the silica particle and multiplying the result by 100, is in the range of 100 to 130.

9 Claims, 2 Drawing Sheets

(56) References Cited

FOREIGN PATENT DOCUMENTS

| | | |
|---|---|---|
| GB | 2402941 A | 12/2004 |
| JP | 3253228 B2 | 11/2001 |
| JP | 2002-38131 A | 2/2002 |
| JP | 2003-155471 A | 5/2003 |
| JP | 2004-204151 A | 7/2004 |
| JP | 2006-2907 A | 1/2006 |
| JP | 2006-7399 A | 1/2006 |
| JP | 2006-66851 A | 3/2006 |
| JP | 2006-75975 A | 3/2006 |
| WO | WO-01/85868 A1 | 11/2001 |

OTHER PUBLICATIONS

Chinese Office Action issued on Jan. 31, 2011 in corresponding Chinese Patent Application No. 200710101113.0 with its English translation.

Examination Report for corresponding U.K. Patent Application No. 0708008.8 dated May 26, 2010.

Examination Report for corresponding U.K. Patent Application No. 0708008.8 dated Oct. 14, 2010.

* cited by examiner

POLISHING COMPOSITION FOR MAGNETIC DISK SUBSTRATE

FIELD OF THE INVENTION

The present invention relates to a polishing composition for a magnetic disk substrate and a method for manufacturing a magnetic disk substrate using the polishing composition.

BACKGROUND OF THE INVENTION

In recent years, there has been a growing trend toward a smaller size and larger capacity magnetic disk drive. To deal with this trend, the unit recording area of a magnetic disk is decreased, while the storage capacity per disk is increased. Since the magnetic signal becomes weaker with a decrease in unit recording area, the detection sensitivity needs to be improved. Therefore, the flying height of a magnetic head should be reduced further, which in turn requires that the surface roughness or waviness of a magnetic disk substrate (also referred to simply as "substrate" herein) be sufficiently small. Moreover, the magnetic head flies and moves over the entire surface of the substrate, so that it is necessary to reduce the waviness of the entire surface of the substrate. To meet these requirements, a polishing composition including silica particles (abrasive particles) with a controlled particle size distribution has been proposed (e.g., JP 2004-204151 A).

JP 2004-204151 A discloses a polishing composition that uses colloidal silica having a specific particle size distribution. In this polishing composition, the particle size of the colloidal silica is reduced, and the particle size distribution is sharpened, thereby reducing the surface roughness of a substrate for a memory hard disk.

However, when the abrasive particles have a smaller particle size or sharper particle size distribution, it is difficult to reduce the maximum height Rmax of the surface roughness of the substrate that is measured with an atomic force microscope (AFM) and the waviness in the peripheral portion of the substrate without impairing the productivity.

SUMMARY OF THE INVENTION

A polishing composition for a magnetic disk substrate of the present invention includes water, silica particles, and at least one or more selected from the group consisting of an acid, a salt of the acid, and an oxidizing agent. The silica particles are observed with a transmission electron microscope to measure a maximum diameter and a projected area of each particle, and the value obtained by dividing the area of a circle whose diameter is the maximum diameter of a silica particle by the projected area of the silica particle and multiplying the result by 100, is in the range of 100 to 130.

A method for manufacturing a magnetic disk substrate of the present invention includes a step of polishing a substrate to be polished with a polishing composition including water, silica particles, and at least one or more selected from the group consisting of an acid, a salt of the acid, and an oxidizing agent. The silica particles are observed with a transmission electron microscope to measure a maximum diameter and a projected area of each particle, and the value obtained by dividing the area of a circle whose diameter is the maximum diameter of a silica particle by the projected area of the silica particle and multiplying the result by 100 is in the range of 100 to 130.

DETAILED DESCRIPTION OF THE INVENTION

The polishing composition for a magnetic disk substrate (also referred to simply as "polishing composition" in the following) of the present invention includes water, silica particles, and at least one or more selected from an acid, a salt of the acid, and an oxidizing agent. The silica particles are observed with a transmission electron microscope (TEM) to measure a maximum diameter and a projected area of each particle, and the value (see Japanese Patent No. 3253228, referred to as "SF1" in the following) obtained by dividing the area of a circle whose diameter is the maximum diameter of a silica particle by the projected area of the silica particle and multiplying the result by 100, is in the range of 100 to 130. The polishing composition of the present invention may reduce the surface roughness (Ra, Rms and Rmax) of a magnetic disk substrate by controlling SF1 within the above range. Particularly, the polishing composition of the present invention may reduce the maximum height Rmax of the surface roughness measured by atomic force microscope (AFM) observation. Therefore, it is possible not only to reduce the flying height of a magnetic head, but also to reduce scratches on the magnetic disk substrate that may affect media yield. The particle shape is closer to a sphere as the SF1 is closer to 100. The measuring method of SF1 will be described later.

In the present invention, to reduce the surface roughness of a magnetic disk substrate further, the SF1 is preferably in the range of 100 to 125, and more preferably in the range of 100 to 110.

It is preferable that a particle size distribution of the silica particles of the present invention is shown as a graph of particle size versus cumulative volume frequency on which the cumulative volume frequency (%) of the silica particles from a smaller particle size side is plotted against the particle size (nm), and the cumulative volume frequency (V) and the particle size (R) satisfy the following formula (1):

$$V \geq 0.5 \times R + 40 \tag{1}$$

where R is in the range of 40 to 100 nm, and that the cumulative volume frequency of the silica particles with a particle size of 15 nm is 20% or less. In this specification, the "particle size" indicates the particle size of primary silica particles and can be determined by a method as described in the following examples. The "cumulative volume frequency" also can be determined by a method as described in the following examples. The "graph of particle size versus cumulative volume frequency" can be obtained by plotting the cumulative volume frequency against the particle size based on the particle size and cumulative volume frequency data of the silica particles. By using the silica particles having the above particle size distribution, the present invention can reduce the polish resistance during polishing of the substrate to be polished, and therefore can reduce the waviness of the substrate surface, especially the waviness of the surface in the peripheral portion. For a disk-shaped substrate, the peripheral portion of the substrate means a region outside the position at a distance of 3R/4 from the center when R is a radius of the substrate. Moreover, the silica particles having the above particle size distribution can reduce long-wavelength waviness with a wavelength that is substantially the same in magnitude as a magnetic head. Such a reduction in long-wavelength waviness can reduce the flying height of the magnetic head, so that high-density recording can be performed efficiently. In this specification, the "long-wavelength waviness" indicates waviness with a wavelength of 0.4 to 2 mm.

To improve the surface smoothness by reducing the surface roughness of a magnetic disk substrate, it is more preferable that the silica particles of the present invention have a particle size distribution in which V and R satisfy the following formula (2):

$$V > 1 \times R + 20 \quad (2)$$

where R is in the range of 40 to 70 nm of the graph of particle size versus cumulative volume frequency. It is further preferable that the silica particles have a particle size distribution in which V and R satisfy the following formula (3):

$$V \geq 1.5 \times R \quad (3)$$

where R is in the range of 40 to 60 nm of the graph of particle size versus cumulative volume frequency. It is still further preferable that the silica particles have a particle size distribution in which V and R satisfy the following formula (4):

$$V \geq 3 \times R - 60 \quad (4)$$

where R is in the range of 40 to 50 nm of the graph of particle size versus cumulative volume frequency. It is still further preferable that the silica particles have a particle size distribution in which V and R satisfy the following formula (5):

$$V \geq R + 50 \quad (5)$$

where R is in the range of 40 to 45 nm of the graph of particle size versus cumulative volume frequency.

To improve the polishing rate, it is preferable that the silica particles have a particle size distribution in which V and R satisfy the following formula (6):

$$V \leq 8R + 5 \quad (6)$$

where R is in the range of 1 to 3 nm of the graph of particle size versus cumulative volume frequency. To reduce the waviness, the cumulative volume frequency of the silica particles with a particle size of 15 nm is preferably 10% or less, more preferably 5% or less, and even more preferably 1% or less. Moreover, the cumulative volume frequency of the silica particles with a particle size of 20 nm is preferably 40% or less, and the cumulative volume frequency of the silica particles with a particle size of 35 nm is preferably 70% or more.

Examples of silica that can be used for the polishing composition of the present invention include colloidal silica, fumed silica, and surface-modified silica. In particular, colloidal silica is preferred because it can further improve the flatness of the substrate surface. The colloidal silica may be commercially available or obtained by a known method for producing it from a silicate aqueous solution. In view of the operability, the silica is used preferably in the form of a slurry. The silica particles of the present invention may be either one type of silica particles or a mixture of two or more types of silica particles, as long as SF1 is within the above range.

There is no particular limitation to a method for adjusting the particle size distribution of the silica particles. For example, when the silica particles are colloidal silica, a desired particle size distribution can be provided by adding particles that serve as a new nucleus for the growth of silica particles during the manufacturing process. Alternatively, two or more types of silica particles with different particles size distributions can be mixed to form a desired particle size distribution.

To improve the polishing rate, the content of the silica particles in the polishing composition of the present invention is preferably 0.5 wt % or more, more preferably 1 wt % or more, even more preferably 3 wt % or more, and even more preferably 5 wt % or more. To improve the flatness of the substrate surface further, the content of the silica particles is preferably 20 wt % or less, more preferably 15 wt % or less, even more preferably 13 wt % or less, and even more preferably 10 wt % or less. That is, the content of the silica particles is preferably 0.5 to 20 wt %, more preferably 1 to 15 wt %, even more preferably 3 to 13 wt %, and even more preferably 5 to 10 wt %.

As an acid and/or its salt that can be used for the polishing composition of the present invention, a compound with a pK1 of 2 or less is preferred to improve the polishing rate. Moreover, to reduce fine scratches, a suitable compound preferably has a pK1 of 1.5 or less, more preferably has a pK1 of 1 or less, and even more preferably is highly acidic such that it cannot be expressed by pK1. Examples of the compounds include the following: inorganic acids such as nitric acid, sulfuric acid, sulfurous acid, persulfuric acid, hydrochloric acid, perchloric acid, phosphoric acid, phosphonic acid, phosphinic acid, pyrophosphoric acid, tripolyphosphoric acid, and amidosulfonic acid and salts thereof; organic phosphonic acids such as 2-aminoethylphosphonic acid, 1-hydroxyethylidene-1,1-diphosphonic acid, aminotri(methylenephosphonic acid), ethylenediaminetetra(methylenephosphonic acid), diethylenetriaminepenta(methylenephosphonic acid), ethane-1,1-diphosphonic acid, ethane-1,1,2-triphosphonic acid, ethane-1-hydroxy-1,1-diphosphonic acid, ethane-1-hydroxy-1,1,2-triphosphonic acid, ethane-1,2-dicarboxy-1,2-diphosphonic acid, methanehydroxyphosphonic acid, 2-phosphonobutane-1,2-dicarboxylic acid, 1-phosphonobutane-2,3,4-tricarboxylic acid, and α-methylphosphonosuccinic acid and salts thereof; aminocarboxylic acids such as glutamic acid, picolinic acid, and aspartic acid and salts thereof; and carboxylic acids such as oxalic acid, nitroacetic acid, maleic acid, and oxaloacetic acid and salts thereof. Above all, the inorganic acids or the organic phosphonic acids and their salts are preferred to reduce fine scratches. Among the inorganic acids and their salts, nitric acid, sulfuric acid, hydrochloric acid, and perchloric acid and their salts are more preferred. Among the organic phosphonic acids and their salts, 1-hydroxyethylidene-1,1-diphosphonic acid, aminotri(methylenephosphonic acid), ethylenediaminetetra(methylenephosphonic acid), and diethylenetriaminepenta (methylenephosphonic acid) and their salts are more preferred. These acids and their salts may be used individually or in combinations of two or more. In this specification, pK1 indicates the logarithm of the reciprocal of a first acid dissociation constant (25° C.) for organic or inorganic compounds. The pK1 of each compound is described, e.g., in "Handbook of Chemistry (Basic) II", 4th ed., Chemical Society of Japan, pp. 316-325.

The salts of the above acids are not particularly limited, and specifically may be salts of the acids with metals, ammonium, alkylammonium, organic amine, etc. Specific examples of the metals include the metals belonging to Group 1A, 1B, 2A, 2B, 3A, 3B, 4A, 6A, 7A or 8 of the periodic table (long-period form). Among them, the salts of the acids with the metals of Group 1A or ammonium are preferred to reduce fine scratches.

To achieve a sufficient polishing rate and improve the surface quality, the content of the acid and its salt in the polishing composition is preferably 0.0001 to 5 wt %, more preferably 0.0003 to 4 wt %, even more preferably 0.001 to 3 wt %, and even more preferably 0.0025 to 2.5 wt %.

To improve the polishing rate, the acid value of the polishing composition of the present invention is preferably 0.2 mgKOH/g or more, more preferably 0.5 mgKOH/g or more, and even more preferably 1 mgKOH/g or more. To improve the surface quality by reducing the surface roughness and the waviness and suppressing the surface defects such as pits or scratches, the acid value of the polishing composition is preferably 10 mgKOH/g or less, more preferably 9 mgKOH/g or less, and even more preferably 8 mgKOH/g or less. Therefore, to improve the polishing rate while maintaining the surface quality, the acid value of the polishing composition is preferably 0.2 to 10 mgKOH/g, more preferably 0.5 to 9 mgKOH/g, and even more preferably 1 to 8 mgKOH/g. The acid value can be adjusted, e.g., by adjusting the content of the acid, as described above. The acid value can be measured in accordance with JIS K0070 (1992).

To improve the polishing rate, examples of the oxidizing agent that can be used for the polishing composition of the present invention include peroxide, permanganic acid or its salt, chromic acid or its salt, peroxoacid or its salt, oxyacid or its salt, metal salts, nitric acids, and sulfuric acids.

The peroxide may be, e.g., hydrogen peroxide, sodium peroxide, barium peroxide, etc. The permanganic acid or its salt may be, e.g., potassium permanganate etc. The chromic acid or its salt may be, e.g., a metal salt of chromic acid, a metal salt of dichromic acid, etc. The peroxo acid or its salt may be, e.g., peroxodisulfuric acid, ammonium peroxodisulfate, a metal salt of peroxodisulfuric acid, peroxophosphoric acid, peroxosulfuric acid, sodium peroxoborate, performic acid, peracetic acid, perbenzoic acid, perphthalic acid, etc. The oxyacid or its salt may be, e.g., hypochlorous acid, hypobromous acid, hypoiodous acid, chloric acid, bromic acid, iodic acid, sodium hypochlorite, calcium hypochlorite, etc. The metal salts may be, e.g., iron (III) chloride, iron (III) sulfate, iron (III) citrate, ammonium iron (III) sulfate, etc. As a suitable oxidizing agent, hydrogen peroxide, iron (III) nitrate, peracetic acid, ammonium peroxodisulfate, iron (III) sulfate, ammonium iron (III) sulfate, or the like may be used. As a more suitable oxidizing agent, hydrogen peroxide may be used, since it is widely available and inexpensive, and also can prevent adhesion of a metal ion to the surface. These oxidizing agents may be used individually or in combinations of two or more.

To improve the polishing rate, the content of the oxidizing agent in the polishing composition is preferably 0.1 wt % or more, more preferably 0.15 wt % or more, and even more preferably 0.2 wt % or more. To improve the surface quality by reducing the surface roughness and the waviness and suppressing the surface defects such as pits or scratches, the content of the oxidizing agent is preferably 1 wt % or less, more preferably 0.8 wt % or less, and even more preferably 0.6 wt % or less. Therefore, to improve the polishing rate while maintaining the surface quality, the content of the oxidizing agent is preferably 0.1 to 1 wt %, more preferably 0.15 to 0.8 wt %, and even more preferably 0.2 to 0.6 wt %.

Examples of water that can be used for the polishing composition of the present invention include distilled water, ion-exchanged water, and ultrapure water. In view of the surface cleaning of a substrate to be polished, the ion-exchanged water and the ultrapure water are preferred, and particularly the ultrapure water is preferred. The content of water in the polishing composition is preferably 60 to 99.4 wt %, and more preferably 70 to 98.9 wt %. Moreover, an organic solvent such as alcohol may be blended to the extent that it does not inhibit the effect of the present invention.

The polishing composition of the present invention may include other components such as a thickening agent, a dispersing agent, an anticorrosive agent, basic substances, and a surface-active agent as needed. The content of the other optional components in the polishing composition is preferably 0 to 10 wt %, and more preferably 0 to 5 wt %.

The polishing composition of the present invention can be prepared by mixing water, silica particles, and at least one or more selected from an acid, a salt of the acid, and an oxidizing agent, and other components as desired with a known method. In this case, the silica particles may be mixed either in the form of condensed slurry or after being diluted in water or the like.

In view of the stability of the silica particles when the polishing composition is prepared, it is preferable that after the components other than the silica particles are dissolved in water, the silica slurry is added to this aqueous solution, and then mixed. To prevent aggregation due to drying of the silica particles, the silica slurry is mixed preferably at a rate that does not make the silica particles dry. Moreover, in view of the dispersibility of the silica particles, it is preferable that the silica slurry is added while stirring the aqueous solution in which the components other than the silica particles are dissolved, and then the resultant solution is mixed.

To improve the polishing rate, the pH of the polishing composition of the present invention is preferably 2.0 or less, more preferably 1.8 or less, even more preferably 1.7 or less, and even more preferably 1.6 or less. To reduce the surface roughness, the pH of the polishing composition is preferably 0.5 or more, more preferably 0.8 or more, even more preferably 1.0 or more, and even more preferably 1.2 or more. To improve the polishing rate, the liquid waste pH of the polishing composition is preferably 3 or less, more preferably 2.5 or less, even more preferably 2.2 or less, and even more preferably 2.0 or less. To reduce the surface roughness, the liquid waste pH is preferably 0.8 or more, more preferably 1.0 or more, even more preferably 1.2 or more, and even more preferably 1.5 or more. The liquid water pH indicates the pH of the polishing wastes in the polishing process using the polishing composition, i.e., the polishing composition immediately after being discharged from a polishing machine.

In the present invention, it is preferable that the silica particles are observed with a transmission electron microscope (TEM) to measure a perimeter and a projected area of each particle, and the value (see Japanese Patent No. 3253228, referred to as "SF2" in the following) obtained by dividing the area of a circle whose circumference is the perimeter of a silica particle by the projected area of the silica particle and multiplying the result by 100 is in the range of 100 to 130. By controlling SF2 within the above range, the surface roughness and waviness of a magnetic disk substrate can be reduced further. Particularly, the maximum height Rmax of the surface roughness measured by atomic force microscope (AFM) observation can be reduced. Therefore, it is possible not only to reduce the flying height of a magnetic head, but also to reduce scratches on the magnetic disk substrate that may affect media yield. The particle surface is smoother as the SF2 is closer to 100. The measuring method of SF2 will be described later.

To reduce the surface roughness and the waviness, the SF2 is preferably in the range of 100 to 120, more preferably in the range of 100 to 115, even more preferably in the range of 100 to 110, and even more preferably in the range of 100 to 105.

Next, a method for manufacturing a magnetic disk substrate of the present invention will be described. This method includes a process of polishing a substrate to be polished with the above polishing composition of the present invention. Therefore, it is possible to suppress a reduction in polishing rate, so that a magnetic disk substrate with reduced surface roughness and waviness can be provided without impairing the productivity. Hereinafter, the explanation similar to that of the polishing composition of the present invention will not be repeated.

For example, the process of polishing the substrate to be polished with the polishing composition of the present invention may include the following: sandwiching the substrate to be polished between surface plates to which a polishing pad such as a nonwoven organic polymer polishing cloth is attached; supplying the polishing composition to a polishing machine preferably at a supply rate of 0.05 to 15 mL/min per 1 cm$^2$ of the substrate to be polished; and polishing the substrate to be polished by moving the surface plates and the substrate.

In the method for manufacturing a magnetic disk substrate of the present invention, the polishing pressure in the polishing process is preferably 11.7 kPa or more, more preferably 12.7 kPa or more, and even more preferably 13.7 kPa or more. This can suppress a reduction in polishing rate and thus can improve the productivity. The polishing pressure in the manufacturing method of the present invention indicates the pressure of a surface plate that is applied to the polishing surface of the substrate during polishing. In the manufacturing method of the present invention, the polishing pressure is preferably 20 kPa or less, more preferably 18 kPa or less, and even more preferably 16 kPa or less. This can suppress the formation of scratches. Accordingly, the polishing pressure in the manufacturing method of the present invention is preferably 11.7 to 20 kPa, more preferably 12.7 to 18 kPa, and even more preferably 13.7 to 16 kPa. The polishing pressure can be adjusted by applying an air pressure or weight on at least one of the surface plate and the substrate to be polished.

In the manufacturing method of the present invention, to reduce the surface roughness economically, it is preferable that a final polishing process of polishing the substrate to be polished at a polishing pressure of less than 11.7 kPa is performed after polishing the substrate at a polishing pressure of 11.7 to 20 kPa in the above polishing process. This final polishing process usually may take about 1 to 2 minutes. To reduce the surface roughness more effectively, the polishing pressure in the final polishing process is preferably 9.8 kPa or less, more preferably 7.8 kPa or less, even more preferably 5.9 kPa or less, and even more preferably 4.9 kPa or less.

The supply rate of the polishing composition in the manufacturing method of the present invention is preferably 0.05 mL/min or more per 1 cm$^2$ of the substrate to be polished. If the supply rate is 0.05 mL/min or more, the polish resistance tends to be low, and thus vibration of the substrate does not occur easily and a load is not likely to be imposed on the peripheral portion of the substrate. Consequently, it is expected that the waviness can be reduced effectively. For more effective reduction in waviness, the supply rate is preferably 0.06 mL/min or more, more preferably 0.07 mL/min or more, even more preferably 0.08 mL/min or more, and even more preferably 0.12 mL/min or more. Moreover, to reduce the waviness economically, the supply rate is preferably 15 mL/min or less, more preferably 10 mL/min or less, even more preferably 1 mL/min or less, and even more preferably 0.5 mL/min or less per 1 cm$^2$ of the substrate to be polished. Therefore, the supply rate of the polishing composition is preferably 0.05 to 15 mL/min, more preferably 0.06 to 10 mL/min, even more preferably 0.07 to 1 mL/min, even more preferably 0.08 to 0.5 mL/min, and even more preferably 0.12 to 0.5 mL/min per 1 cm$^2$ of the substrate to be polished.

The polishing composition of the present invention may be supplied continuously to a polishing machine by using a pump or the like. Moreover, the polishing composition may be supplied to a polishing machine as a single solution containing all the components. Alternatively, in view of the stability or the like of the polishing composition, it may be divided into a plurality of component solutions, and two or more component solutions may be supplied. In the latter case, the plurality of component solutions are mixed, e.g., in a supply pipe or on the substrate to be polished, thereby forming the polishing composition of the present invention.

The polishing pad used in the present invention is not particularly limited, and may be a suede type, a nonwoven fabric type, a polyurethane closed-cell foam type, or a two-layer type in which these materials are laminated.

In the present invention, the waviness of the surface in the peripheral portion of the substrate can be improved further by controlling the relative velocity of the substrate to be polished with respect to the polishing pads in the polishing process. In this specification, the relative velocity of the substrate to be polished with respect to the polishing pads is expressed by the following formula.

$$\text{Relative velocity } (m/sec) = (\pi/4) \times (R\text{up} - R\text{down}) \times (D\text{out} + D\text{in})$$

Rup: the number of revolutions (revolution/sec) of the upper surface plate

Rdown: the number of revolutions (revolution/sec) of the lower surface plate (identified as a positive value if it rotates in the same direction as the upper surface plate and as a negative value if it rotates in the opposite direction to the upper surface plate)

Dout: the outer diameter (m) of the upper or lower surface plate

Din: the inner diameter (m) of the upper or lower surface plate

To reduce the waviness of the surface in the peripheral portion, the relative velocity is preferably 1 m/sec or less, more preferably 0.8 m/sec or less, and even more preferably 0.6 m/sec or less. To improve the productivity, the relative velocity is preferably 0.1 m/sec or more, more preferably 0.2 m/sec or more, even more preferably 0.3 m/sec or more, and even more preferably 0.4 m/sec or more. That is, the relative velocity is preferably 0.1 to 1 m/sec, more preferably 0.2 to 0.8 m/sec, even more preferably 0.3 to 0.6 m/sec, and even more preferably 0.4 to 0.6 m/sec.

When the polishing process of the substrate to be polished includes multiple stages, polishing with the polishing composition of the present invention is performed preferably in any of the second and subsequent stages, and more preferably in the final polishing process. In such a case, to avoid the abrasive material or polishing composition of the previous stage entering, different polishing machines may be used in each stage. When using the different polishing machines, it is preferable that the substrate to be polished is cleaned after each polishing process. The polishing machine is not particularly limited, and a known polishing machine for polishing a magnetic disk substrate can be used.

There is no particular limitation to the surface properties of the substrate to be polished that is suitably used in the present invention. For example, a substrate having the surface properties with a surface roughness Ra of about 1 nm is preferred to produce a substrate for high-density recording. The surface roughness Ra is a measure of surface smoothness and may be evaluated, e.g., as measurable roughness at a wavelength of 10 μm or less using an atomic force microscope (AFM), although the evaluation method is not limited. This surface roughness Ra can be expressed as a center line average roughness Ra.

The materials for the substrate to be polished that is suitably used in the present invention may include, e.g., metals or metalloids such as silicon, aluminum, nickel, tungsten, copper, tantalum, and titanium, alloys of these metals, glassy substances such as glass, glassy carbon, and amorphous carbon, ceramic materials such as alumina, silicon dioxide, silicon nitride, tantalum nitride, and titanium carbide, and resins such as a polyimide resin. Among them, the substrate to be polished including metals such as aluminum, nickel, tungsten, and copper or alloys that contain these metals as the main component is preferred. For example, a Ni—P plated aluminum alloy substrate and a glass substrate such as crystallized glass or tempered glass are preferred, and particularly the Ni—P plated aluminum alloy substrate is preferred.

The shape of the substrate to be polished is not particularly limited, and a shape with a flat portion such as a disk, plate, slab, or prism and a shape with a curved portion such as a lens may be used. In particular, a disk-shaped substrate is suitable. When the substrate to be polished has a disk shape, the outer diameter is, e.g., about 2 to 95 mm and the thickness is, e.g., about 0.5 to 2 mm.

According to the present invention, a magnetic disk substrate with reduced surface roughness can be provided without impairing the productivity. In particular, the maximum height Rmax of the surface roughness measured by observing the surface of the magnetic disk substrate with an atomic force microscope (AFM) can be improved, e.g., to less than 3 nm, preferably less than 2.5 nm, more preferably less than 2 nm. If the maximum height Rmax is less than 3 nm, the flying height of a magnetic head can be reduced, and the recording density can be increased.

EXAMPLES

The following examples further describe and demonstrate embodiments of the present invention. The examples are given solely for the purpose of illustration and are not to be construed as limitations of the present invention.

The polishing compositions having the compositions as shown in Tables 1 and 2 were used to polish the following substrate to be polished, and the waviness of the substrate surface and the surface roughness were evaluated.

Substrate to be Polished

As the substrate to be polished, a Ni—P plated aluminum alloy substrate was polished roughly with a polishing composition including an alumina abrasive beforehand. This substrate had a thickness of 1.27 mm, an outer diameter of 95 mm, an inner diameter of 25 mm, and a center line average roughness Ra of 1 nm, which was measured with an AFM ("TM-M5E" manufactured by Veeco Instruments). Moreover, the amplitude of long-wavelength waviness (wavelength: 0.4 to 2 mm) was 2.06 nm, and the amplitude of short-wavelength waviness (wavelength: 50 to 400 μm) was 2.12 nm.

Preparation of Polishing Compositions in Tables 1 and 2

As shown in Tables 1 and 2, colloidal silica (silicas A to L), a sulfuric acid (special grade chemicals manufactured by Wako Pure Chemical Industries, Ltd.), HEDP (1-hydroxyethylidene-1,1-diphosphonic acid, "DEQUEST 2010" manufactured by Solutia Japan Limited) and a hydrogen peroxide solution (with a concentration of 35 wt %, manufactured by Adeka Corporation) were added to ion-exchanged water and mixed to prepare polishing compositions having the following compositions. The order of mixing was as follows: first, the sulfuric acid and/or HEDP were added to the ion-exchanged water, then the hydrogen peroxide solution was added, and finally colloidal silica slurry was blended while stirring it to avoid gelation. The mixing ratio was defined as follows. Each of the polishing compositions in Examples 12 to 28 and Comparative Examples 8 to 11 had an acid value of 4.9 mgKOH/g and pH of 1.5.

Examples 1 to 9 and Comparative Examples 1 to 6: 5 wt % silica, 0.4 wt % sulfuric acid, and 0.3 wt % hydrogen peroxide solution (no HEDP was added)

Examples 10, 11 and Comparative Example 7: 7 wt % silica, 2 wt % HEDP, and 0.6 wt % hydrogen peroxide solution (no sulfuric acid was added) Examples 12 to 28 and Comparative Examples 8 to 11: 7 wt % silica, 0.4 wt % sulfuric acid, 0.1 wt % HEDP, and 0.4 wt % hydrogen peroxide solution SF1 and SF2 of each of the silicas A to L used in preparing the polishing compositions were determined by the following method.

Measuring Method of SF1 of silicas A to L

A sample was observed with a transmission electron microscope "JEM-2000FX" (80 kV, 10000-15000X) manufactured by JEOL Ltd. according to the manufacturer's instruction manual, and TEM (transmission electron microscope) images were photographed. These pictures were scanned into a personal computer as image data using a scanner. Then, the maximum diameter and the projected area of a single particle were measured to determine SF1 with analysis software "WinROOF Ver 3.6" (produced by Mitani Corporation). In this manner, SF1 values of 100 silica particles were obtained, and an average of the SF1 values was calculated. This average was shown as SF1 in Tables 1 and 2.

Measuring Method of SF2 of Silicas A to L

A sample was observed with a transmission electron microscope "JEM-2000FX" (80 kV, 10000-15000X) manufactured by JEOL Ltd. according to the manufacturer's instruction manual, and TEM (transmission electron microscope) images were photographed. These pictures were scanned into a personal computer as image data using a scanner. Then, the perimeter and the projected area of a single particle were measured to determine SF2 with analysis software "WinROOF Ver 3.6" (produced by Mitani Corporation). In this manner, SF2 values of 100 silica particles were obtained, and an average of the SF2 values was calculated. This average was shown as SF2 in Tables 1 and 2.

Moreover, a cumulative volume frequency of each of the silicas A to L used in preparing the polishing compositions was determined by the following method.

Measuring Method of Cumulative Volume Frequency of Silicas A to L

Figure 1:
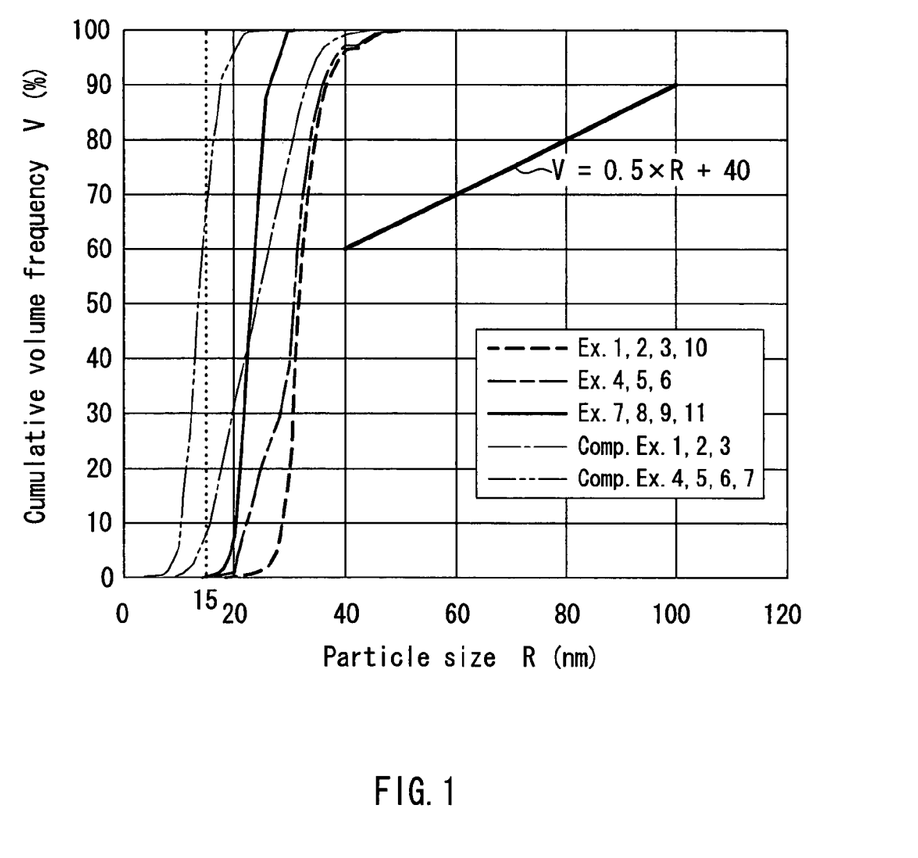
FIG. 1 is a graph of particle size versus cumulative volume frequency in Examples 1 to 11 of the present invention and Comparative Examples 1 to 7.
Figure 2:
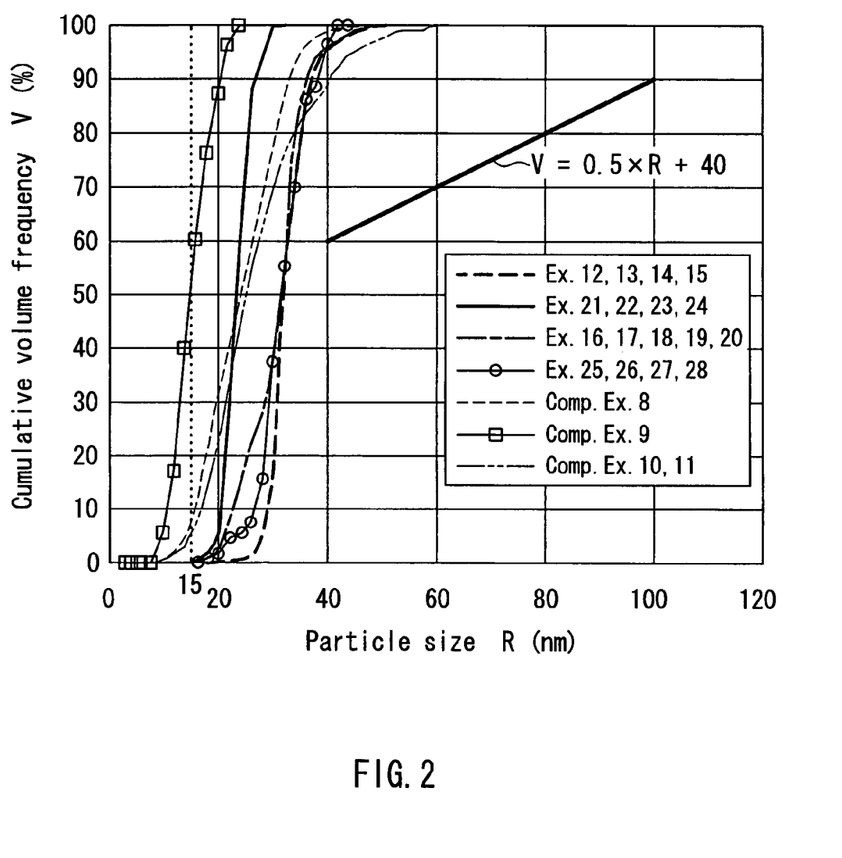
FIG. 2 is a graph of particle size versus cumulative volume frequency in Examples 12 to 28 of the present invention and Comparative Examples 8 to 11.

The silica particle slurry was used as a sample, and TEM images were photographed in the same manner as described above. These pictures were scanned into a personal computer as image data using a scanner. Then, the diameter of a circle having the same area as the projected area of a particle (Heywood diameter) of each silica particle was determined with the above analysis software and identified as a particle size. In this manner, the particles sizes of 1000 or more silica particles were obtained. According to the result, the particle size was converted to a particle volume with spreadsheet software "EXCEL" (produced by Microsoft Corporation), thus providing a particle size distribution. Based on the particle size distribution data of the silica particles, the ratio (volume ratio) of the particles with a specific particle size to the total particles was shown as a cumulative frequency from a smaller particle size side, so that a cumulative volume frequency (%) was obtained. FIG. 1 is a graph of particle size versus cumulative volume frequency in Examples 1 to 11 and Comparative Examples 1 to 7 based on the cumulative volume frequency obtained by the above measuring method. FIG. 2 is a graph of particle size versus cumulative volume frequency in Examples 12 to 28 and Comparative Examples 8 to 11 based on the cumulative volume frequency obtained by the above measuring method. In Tables 1 and 2, the particle size of the silica particles is a particle size (D50) that corresponds to a cumulative volume frequency of 50%.

Using the above polishing compositions, the substrate to be polished was polished under the following polishing conditions. Subsequently, the waviness and the surface roughness of the polished substrate were measured under the following conditions and evaluated. Tables 1 and 2 show the results. After polishing 10 substrates for each of the working and comparative examples, both surfaces of the individual substrates were measured, and an average of the measured values of 10 substrates (i.e., a total of 20 surfaces, including upper and lower surfaces) was calculated. Accordingly, the data shown in Tables 1 and 2 are the resultant averages. The polishing rate in Table 2 was measured by the following method.

Polishing Conditions

Polishing test machine: "9B Double Side Polisher" manufactured by Speedfam Co., Ltd.

Polishing pad: suede type (thickness: 0.9 mm, average pore diameter: 30 μm) manufactured by Fujibo Amount of slurry supply: 100 mL/min (supply rate per 1 cm² of a substrate to be polished: 0.072 mL/min)

Number of revolutions of lower surface plate: 32.5 rpm

Polishing time: 5 minutes for the first stage of the polishing process in Examples 1 to 11 and Comparative Examples 1 to 7; 4 minutes for the first stage of the polishing process in Examples 12 to 28 and Comparative Examples 8 to 11; and 1.5 minutes for the second stage (final polishing) of the polishing process in Examples 15, 20, 24, and 28.

(Polishing Pressure: See Tables 1 and 2)

Measurement Conditions of Waviness

Measuring device: "ThoT model M4224" manufactured by ThoT Technologies Inc.

Vibrometer: laser Doppler vibrometer (iodine stabilized He—Ne laser: wavelength 633 nm)

Measurement wavelength: 0.4 to 2 mm (long-wavelength waviness) and 50 to 400 μm (short-wavelength waviness)

Measurement position: the entire surface between 20 mm and 46 mm radius from the center of a substrate (the amplitude of waviness at a radius of 44 mm from the center of the substrate is shown in Tables 1 and 2)

Substrate rotational speed: 6000 rpm

Gain: 16

Filter: 10 kHz

Laser range: 5 mm/s/V

Track pitch: 0.01 mm

Measuring Method of Surface Roughness

An AFM ("TM-M5E" manufactured by Veeco Instruments) was used to measure points on both sides of each substrate that were located in the middle portion between the inner and outer circumferences, thereby determining the center line average roughness Ra, the root-mean-square roughness Rms, and the maximum height Rmax. An average of each of the measured values of 10 substrates (i.e., a total of 20 surfaces, including upper and lower surfaces) was calculated, and the resultant averages Ra, Rms, and Rmax are shown in Tables 1 and 2.

(AFM Measurement Conditions)

Mode: non-contact

Area: 5×5 μm

Scan rate: 1.0 Hz

Cantilever: UL20B

Measuring Method of Polishing Rate

The weights of each substrate before and after polishing were measured with a gravimeter ("BP-210S" manufactured by Sartorius Ltd.), and a change in weight of each substrate was determined. Then, an average of the weight changes of 10 substrates was obtained as a weight decrement, and the weight decrement was divided by the polishing time to give a weight decreasing rate. This weight decreasing rate was substituted in the following equation and thus converted to a polishing rate (μm/min).

$$\text{Polishing rate (μm/min)} = \text{weight decreasing rate (g/min)}/\text{area of one side of a substrate (mm}^2\text{)}/\text{Ni—P plating density (g/cm}^3\text{)} \times 10^6$$

(where the area of one side of the substrate was 6597 mm² and the Ni—P plating density was 7.9 g/cm³)

TABLE 1

| | Silica particles | | | | Acid | | | | Waviness | | |
|---|---|---|---|---|---|---|---|---|---|---|---|
| | Abrasive grain type | Particle size D50 (nm) | SF1 | SF2 | Cumulative volume frequency at 15 nm (%) | value (mgKOH/g) | pH | Liquid waste pH | Polishing pressure (kPa) | Short wavelength (nm) | Long wavelength (nm) | Surface roughness Ra (nm) |
| Ex. 1 | Silica A | 32 | 118 | 113 | 0.22 | 4.5 | 1.5 | 1.8 | 7.8 | 0.242 | 0.576 | 0.088 |
| Ex. 2 | | | | | | | | 1.9 | 11.8 | 0.199 | 0.548 | 0.088 |
| Ex. 3 | | | | | | | | 1.9 | 15.7 | 0.196 | 0.555 | 0.088 |
| Ex. 4 | Silica B | 31 | 119 | 112 | 0.26 | 4.5 | 1.5 | 1.8 | 7.8 | 0.220 | 0.545 | 0.081 |
| Ex. 5 | | | | | | | | 1.9 | 11.8 | 0.190 | 0.539 | 0.081 |
| Ex. 6 | | | | | | | | 1.9 | 15.7 | 0.194 | 0.527 | 0.081 |
| Ex. 7 | Silica C | 24 | 123 | 109 | 0.37 | 4.5 | 1.5 | 1.8 | 7.8 | 0.242 | 0.623 | 0.077 |
| Ex. 8 | | | | | | | | 1.9 | 11.8 | 0.203 | 0.596 | 0.077 |
| Ex. 9 | | | | | | | | 1.9 | 15.7 | 0.200 | 0.597 | 0.077 |
| Ex. 10 | Silica A | 32 | 118 | 113 | 0.22 | 13 | 1.6 | 1.8 | 7.8 | 0.251 | 0.581 | 0.088 |
| Ex. 11 | Silica C | 24 | 123 | 109 | 0.37 | 13 | 1.6 | 1.8 | 7.8 | 0.254 | 0.625 | 0.077 |
| Comp. Ex. 1 | Silica D | 24 | 134 | 106 | 8.13 | 4.5 | 1.5 | 1.8 | 7.8 | 0.218 | 0.605 | 0.098 |
| Comp. Ex. 2 | | | | | | | | 1.8 | 11.8 | 0.215 | 0.575 | 0.098 |
| Comp. Ex. 3 | | | | | | | | 1.9 | 15.7 | 0.216 | 0.583 | 0.098 |
| Comp. Ex. 4 | Silica E | 15 | 131 | 105 | 65.8 | 4.5 | 1.5 | 1.8 | 7.8 | 0.232 | 0.717 | 0.078 |
| Comp. Ex. 5 | | | | | | | | 1.9 | 11.8 | 0.230 | 0.698 | 0.078 |
| Comp. Ex. 6 | | | | | | | | 1.9 | 15.7 | The measuring device was stopped by high friction. | | 0.078 |
| Comp. Ex. 7 | | | | | | 13 | 1.6 | 1.8 | 7.8 | 0.328 | 0.721 | 0.078 |

Silica A: CATALOID PPS-50 manufactured by Catalysts & Chemicals Industries Co., Ltd.
Silica B: A mixture of CATALOID PPS-50 (75 wt %) and CATALOID PPS-40 (25 wt %), both manufactured by Catalysts & Chemicals Industries Co., Ltd.
Silica C: CATALOID PPS-40 manufactured by Catalysts & Chemicals Industries Co., Ltd.
Silica D: SYTON 524 manufactured by DuPont Air Products Nanomaterials L.L.C.
Silica E: CATALOID PPS-30 manufactured by Catalysts & Chemicals Industries Co., Ltd.

TABLE 2

| | Silica particles | | | | Liquid waste pH | Polishing pressure (kPa) | | Polishing rate (μm/min) | Surface roughness (nm) | | | Waviness (nm) | |
| | Abrasive grain type | Particle size D50 (nm) | SF1 | SF2 | Cumulative volume frequency at 15 nm (%) | | 1st stage | 2nd stage | | Ra | Rms | Rmax | Short wavelength | Long wavelength |
|---|---|---|---|---|---|---|---|---|---|---|---|---|---|---|
| Ex. 12 | Silica F | 32 | 118 | 113 | 0.2 | 1.9 | 11.7 | | 0.13 | 0.10 | 0.12 | 1.7 | 0.21 | 0.65 |
| Ex. 13 | | | | | | 1.9 | 13.7 | | 0.16 | 0.09 | 0.11 | 1.5 | 0.21 | 0.62 |
| Ex. 14 | | | | | | 2.0 | 15.7 | | 0.18 | 0.07 | 0.10 | 1.3 | 0.20 | 0.62 |
| Ex. 15 | | | | | | 2.0 | 15.7 | 4.9 | 0.16 | 0.09 | 0.12 | 1.4 | 0.20 | 0.62 |
| Ex. 16 | Silica G | 31 | 119 | 112 | 0.3 | 1.8 | 7.8 | | 0.09 | 0.08 | 0.10 | 1.4 | 0.21 | 0.72 |
| Ex. 17 | | | | | | 1.9 | 11.7 | | 0.13 | 0.11 | 0.14 | 2.6 | 0.20 | 0.64 |
| Ex. 18 | | | | | | 1.9 | 13.7 | | 0.15 | 0.09 | 0.12 | 2.7 | 0.21 | 0.69 |
| Ex. 19 | | | | | | 2.0 | 15.7 | | 0.18 | 0.07 | 0.10 | 2.9 | 0.22 | 0.74 |
| Ex. 20 | | | | | | 2.0 | 15.7 | 4.9 | 0.15 | 0.08 | 0.10 | 1.4 | 0.21 | 0.72 |
| Ex. 21 | Silica H | 24 | 123 | 109 | 0.4 | 1.9 | 11.7 | | 0.15 | 0.07 | 0.10 | 2.1 | 0.21 | 0.72 |
| Ex. 22 | | | | | | 1.9 | 13.7 | | 0.16 | 0.07 | 0.10 | 1.6 | 0.21 | 0.71 |
| Ex. 23 | | | | | | 2.0 | 15.7 | | 0.17 | 0.07 | 0.10 | 1.2 | 0.21 | 0.68 |
| Ex. 24 | | | | | | 2.0 | 15.7 | 4.9 | 0.16 | 0.07 | 0.10 | 1.5 | 0.21 | 0.68 |
| Ex. 25 | Silica L | 33 | 113 | 102 | 0.0 | 1.9 | 11.7 | | 0.13 | 0.10 | 0.11 | 1.3 | 0.21 | 0.62 |
| Ex. 26 | | | | | | 1.9 | 13.7 | | 0.15 | 0.08 | 0.10 | 1.2 | 0.20 | 0.61 |
| Ex. 27 | | | | | | 2.0 | 15.7 | | 0.17 | 0.07 | 0.10 | 1.1 | 0.20 | 0.61 |
| Ex. 28 | | | | | | 2.0 | 15.7 | 4.9 | 0.14 | 0.08 | 0.11 | 1.1 | 0.21 | 0.61 |
| Comp. Ex. 8 | Silica I | 24 | 134 | 106 | 8 | 1.8 | 7.8 | | 0.09 | 0.10 | 0.16 | 10 | 0.21 | 0.71 |
| Comp. Ex. 9 | Silica J | 15 | 150 | 131 | 50 | 1.8 | 7.8 | | 0.07 | 0.10 | 0.25 | 12 | 0.24 | 0.84 |
| Comp. Ex. 10 | Silica K | 25 | 170 | 138 | 5 | 1.8 | 7.8 | | 0.08 | 0.17 | 0.26 | 3.4 | 1.19 | 1.33 |
| Comp. Ex. 11 | | | | | | 1.8 | 11.7 | | Polishing of the substrate was impossible due to a high polish resistance. | | | | | |

Silica F: Commercial product, D50 = 32 nm, manufactured by Catalysts & Chemicals Industries Co., Ltd.
Silica G: Commercial product, D50 = 31 nm, manufactured by Catalysts & Chemicals Industries Co., Ltd.
Silica H: Commercial product, D50 = 24 nm, manufactured by Catalysts & Chemicals Industries Co., Ltd.
Silica I: Commercial product, D50 = 24 nm, manufactured by DuPont
Silica J: Commercial product, D50 = 15 nm, manufactured by DuPont
Silica K: Commercial product, D50 = 25 nm, manufactured by Catalysts & Chemicals Industries Co., Ltd.
Silica L: Development product, D50 = 33 nm, manufactured by Catalysts & Chemicals Industries Co., Ltd.

As shown in Tables 1 and 2, the polishing compositions of Examples 1 to 28 having SF1 in the range of 100 to 130 reduced the surface roughness without lowering the polishing rate, compared to Comparative Examples 1 to 11. In particular, the results confirmed that the maximum height Rmax was reduced effectively. Moreover, since V≥0.5×R+40 is satisfied, and the cumulative volume frequency of the silica particles with a particle size of 15 nm is 20% or less, the polishing compositions of Examples 1 to 28 reduced the waviness (long-wavelength waviness and short-wavelength waviness) in the peripheral portion significantly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A polishing composition for a magnetic disk substrate comprising:
    water;
    silica particles; and
    at least one or more selected from the group consisting of an acid, a salt of the acid, and an oxidizing agent,
    wherein the silica particles have a value (SF1) of 113, wherein the value is obtained by dividing an area of a circle whose diameter is the maximum diameter of the silica particle by the projected area of the silica particle and multiplying the result by 100, when observed with a transmission electron microscope to measure the maximum diameter and the projected area of each particle,
    wherein the silica particles have a value (SF2) of 102, wherein the value is obtained by dividing an area of a circle whose circumference is a perimeter of the silica particle by the projected area of the silica particle and multiplying the result by 100, when observed with a transmission electron microscope to measure the perimeter and the projected area of each particle, and
    wherein in a graph of particle size versus cumulative volume frequency obtained by plotting a cumulative volume frequency (%) of the silica particles from a smaller particle size side against a particle size (nm) of the silica particles measured by transmission electron microscope observation, the cumulative volume frequency (V) and the particle size (R) satisfy the following formula (5):

$$V > R + 50 \tag{5}$$

where R is in a range of 40 to 45 nm, and
    the cumulative volume frequency of the silica particles with a particle size of 15 nm is 20% or less.

2. The polishing composition according to claim 1, wherein the silica particles are colloidal silica.

3. The polishing composition according to claim 1, wherein an acid value of the polishing composition is 10 mgKOH/g or less.

4. The polishing composition according to claim 1, wherein a content of the oxidizing agent is 0.1 to 1 wt %.

5. A method for manufacturing a magnetic disk substrate comprising:
 a step of polishing a substrate to be polished with the polishing composition according to claim 1.

6. The method according to claim 5, wherein the silica particles are colloidal silica.

7. The method according to claim 5, wherein the substrate to be polished is polished at a polishing pressure of 11.7 to 20 kPa in the polishing step.

8. The method according to claim 5, further comprising a final polishing step of polishing the substrate to be polished at a polishing pressure of less than 11.7 kPa after polishing the substrate to be polished at a polishing pressure of 11.7 to 20 kPa in the polishing step.

9. The polishing composition according to claim 1, wherein the polishing composition for a magnetic disk substrate is a polishing composition for a Ni-P aluminum alloy substrate.

* * * * *